US011214910B2

(12) United States Patent
Chupka

(10) Patent No.: US 11,214,910 B2
(45) Date of Patent: Jan. 4, 2022

(54) WASHING MACHINE APPLIANCE AND MOTOR ASSEMBLY THEREFOR

(71) Applicant: Haier US Appliance Solutions, Inc., Wilmington, DE (US)

(72) Inventor: Edward Simeon Chupka, Fisherville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 111 days.

(21) Appl. No.: 16/679,666

(22) Filed: Nov. 11, 2019

(65) Prior Publication Data

US 2021/0140089 A1 May 13, 2021

(51) Int. Cl.
*D06F 37/30* (2020.01)
*H02K 7/14* (2006.01)
*D06F 21/08* (2006.01)
*D06F 37/20* (2006.01)
*H02K 7/12* (2006.01)

(52) U.S. Cl.
CPC ............ *D06F 37/304* (2013.01); *D06F 21/08* (2013.01); *D06F 37/206* (2013.01); *H02K 7/12* (2013.01); *H02K 7/14* (2013.01)

(58) Field of Classification Search
CPC ...... D06F 37/206; D06F 37/304; D06F 21/08; H02K 7/12; H02K 7/14
See application file for complete search history.

(56) References Cited

U.S. PATENT DOCUMENTS

| 2,156,698 A | 5/1939 | Martin | |
|---|---|---|---|
| 6,474,114 B1 * | 11/2002 | Ito | D06F 37/304 68/140 |
| 9,398,743 B1 | 7/2016 | Fox et al. | |
| 2004/0221477 A1 * | 11/2004 | Han | D06F 58/08 34/601 |
| 2014/0069145 A1 * | 3/2014 | Chupka | H02K 7/108 68/12.24 |
| 2016/0376741 A1 * | 12/2016 | Kim | H02K 7/003 310/90 |
| 2018/0237975 A1 * | 8/2018 | Chupka | D06F 37/40 |

* cited by examiner

Primary Examiner — Joseph L. Perrin
(74) Attorney, Agent, or Firm — Dority & Manning, P.A.

(57) ABSTRACT

A washing machine appliance or drive assembly, as provided herein, may include an agitator drive shaft and a motor. The agitator drive shaft may extend along a drive axis from a first end to a second end defang a mounting portion about the drive axis. The motor may be operably connected to the agitator drive shaft to drive rotation thereof. The motor may include a rotor and a stator. The rotor may be fixed to the agitator drive shaft at the second end. The rotor may define a central aperture along the drive axis. The central aperture may define an interior profile complementary to the mounting portion of the agitator drive shaft. The stator may be rotationally fixed and positioned radially inward from the rotor.

19 Claims, 14 Drawing Sheets

WASHING MACHINE APPLIANCE AND MOTOR ASSEMBLY THEREFOR

FIELD OF THE INVENTION

The present subject matter relates generally washing machine appliances, and more particularly to a motor assembly for driving rotation of certain elements in a washing machine appliance.

BACKGROUND OF THE INVENTION

Washing machines are typically equipped to operate with one or more modes or cycles such as wash, rinse, and spin modes. During a wash or rinse mode for a vertical drive axis washing machine, the laundry articles are usually submerged at least partially within a wash or rinse fluid while an agitator is used to impart motion to the laundry articles that are contained within a wash basket. A wash tub contains the fluid, agitator, and wash basket.

During a wash or rinse mode, the wash basket of some washing machines remains stationary while the agitator rotates to impart movement to the laundry articles. During a spin mode, typically both the agitator and the wash basket are rotated so as to subject the articles in the laundry to centrifugal forces. These forces cause water and other fluids to be wrung from the clothes. These liquids can exit the wash basket through holes positioned along the outer wall of the wash basket for subsequent removal from the wash tub.

For operation of a washing machine appliance between the wash, rinse, and spin modes, it is desirable to independently control the movement of the agitator and wash basket. More specifically, during the wash and rinse modes, the wash basket may be held stationary while the agitator is rotated so as to impart movement to the laundry articles. During the spin mode, however, rotation of the wash basket is required to wring liquid from the articles as set forth above.

In order to control the rotation of the agitator and wash basket, a vertical drive axis washing machine can be equipped with, for example, a clutch for engaging and disengaging the wash basket from a motor that can be used to rotate the agitator or wash basket. As the washing machine executes a cleaning process, the clutch is operated at certain times in order to provide the desired movement of the agitator and wash basket during one or more wash, rinse, or spin cycles.

Conventionally, movement of the clutch has typically been performed and controlled by complex linkages having multiple parts. These parts must be collected and assembled during manufacture of the appliance. Moreover, relatively large motors, such as direct drive motors, have been required to rotate the wash basket and agitator. These systems may be difficult to assemble, expensive, inefficient, and bulky. For instance, a spline, which can be bulky and difficult to machine, may be required to join a drive rod to a rotor. Furthermore, a relatively complex multi-speed motor may be required (e.g., to rotate the agitator or wash basket at different speeds). Additionally or alternatively, securing the motor (e.g., to the wash tub) can be difficult since vibrations generated by the motor through the appliance can rapidly wear out traditional fasteners that might hold the motor beneath the tub.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a washing machine appliance is provided. The washing machine appliance may include a wash tub, a wash basket, an agitator, an agitator drive shaft, a stationary housing, and a motor. The wash basket may be received in the wash tub to retain laundry articles. The agitator may be rotatably positioned in the wash basket to impart motion to the laundry articles within the wash basket. The agitator drive shaft may be attached to the agitator to rotate therewith. The agitator drive shaft may extend along a drive axis from a first end to a second end. The second end may define a mounting portion about the drive axis. The mounting portion may include a curved face and a recessed face. The curved face may be defined along a semi-circular profile. The semi-circular profile may extend circumferentially about the drive axis. The recessed face may be defined radially-inward from the semi-circular profile to define a circumferential gap about the drive axis. The stationary housing may be disposed about the agitator drive shaft. The stationary housing may be attached to the wash tub. The motor may be operably connected to the agitator drive shaft to drive rotation thereof. T The motor may include a rotor and a stator. The rotor may be fixed to the agitator drive shaft at the second end. The rotor may define a central aperture along the drive axis. The central aperture may define an interior profile complementary to the mounting portion of the agitator drive shaft. The stator may be rotationally fixed and positioned radially inward from the rotor.

In another exemplary aspect of the present disclosure, a drive assembly for a washing machine appliance is provided. The drive assembly may include an agitator drive shaft and a motor. The agitator drive shaft may extend along a drive axis from a first end to a second end. The second end may define a mounting portion about the drive axis. The mounting portion may include a curved face and a recessed face. The curved face may be defined along a semi-circular profile. The semi-circular profile may extend circumferentially about the drive axis. The recessed face may be defined radially-inward from the semi-circular profile to define a circumferential gap about the drive axis. The motor may be operably connected to the agitator drive shaft to drive rotation thereof. The motor may include a rotor and a stator. The rotor may be fixed to the agitator drive shaft at the second end. The rotor may define a central aperture along the drive axis. The central aperture may define an interior profile complementary to the mounting portion of the agitator drive shaft. The stator may be rotationally fixed and positioned radially inward from the rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
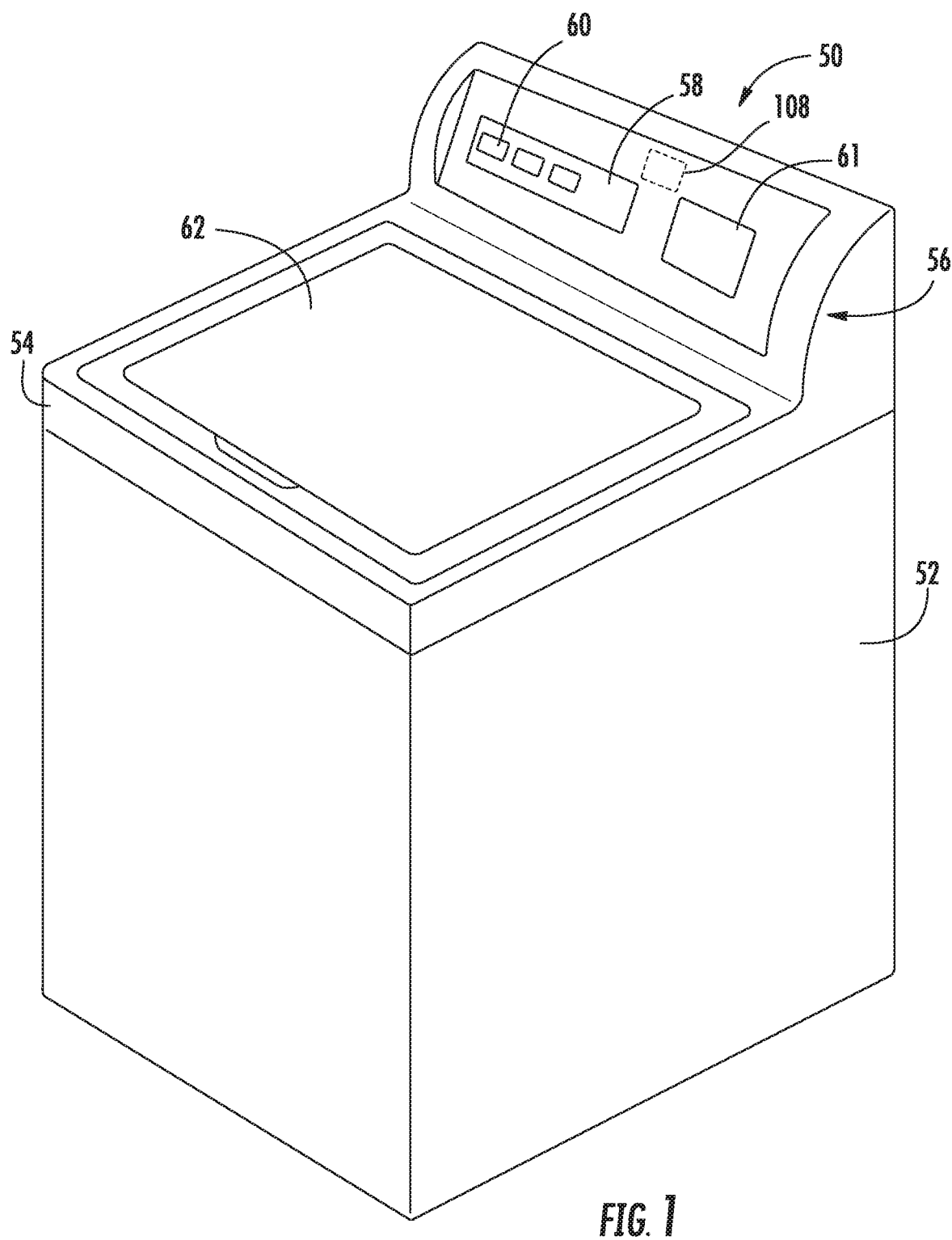
FIG. 1 provides a perspective view of a washing machine appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one element from another and are not intended to signify location or importance of the individual elements. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
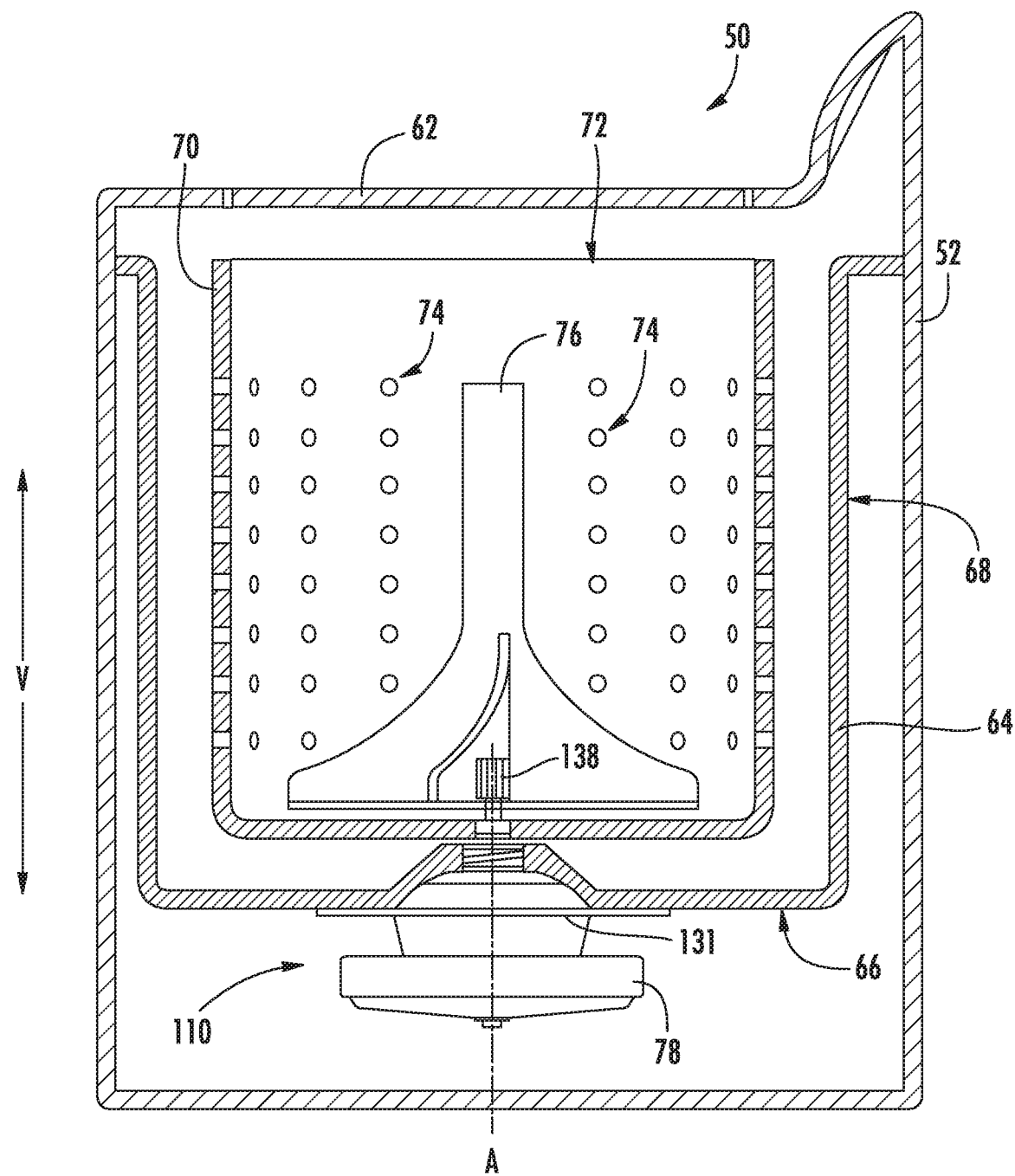
FIG. 2 provides a side, sectional view of the exemplary washing machine appliance of FIG. 1.
Figure 3:
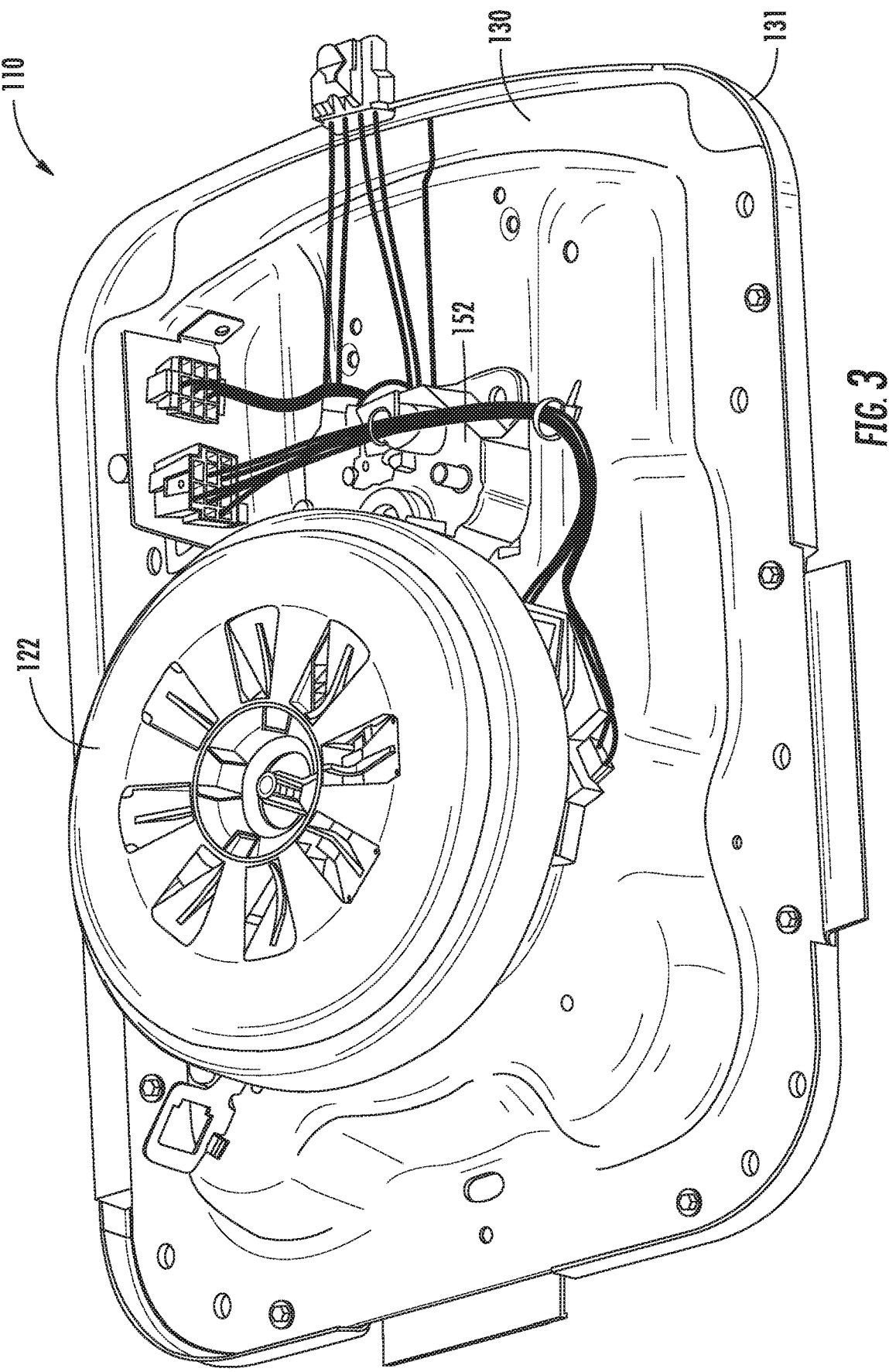
FIG. 3 provides a bottom perspective view of an exemplary drive assembly for the exemplary washing machine appliance of FIG. 1.
Figure 4:
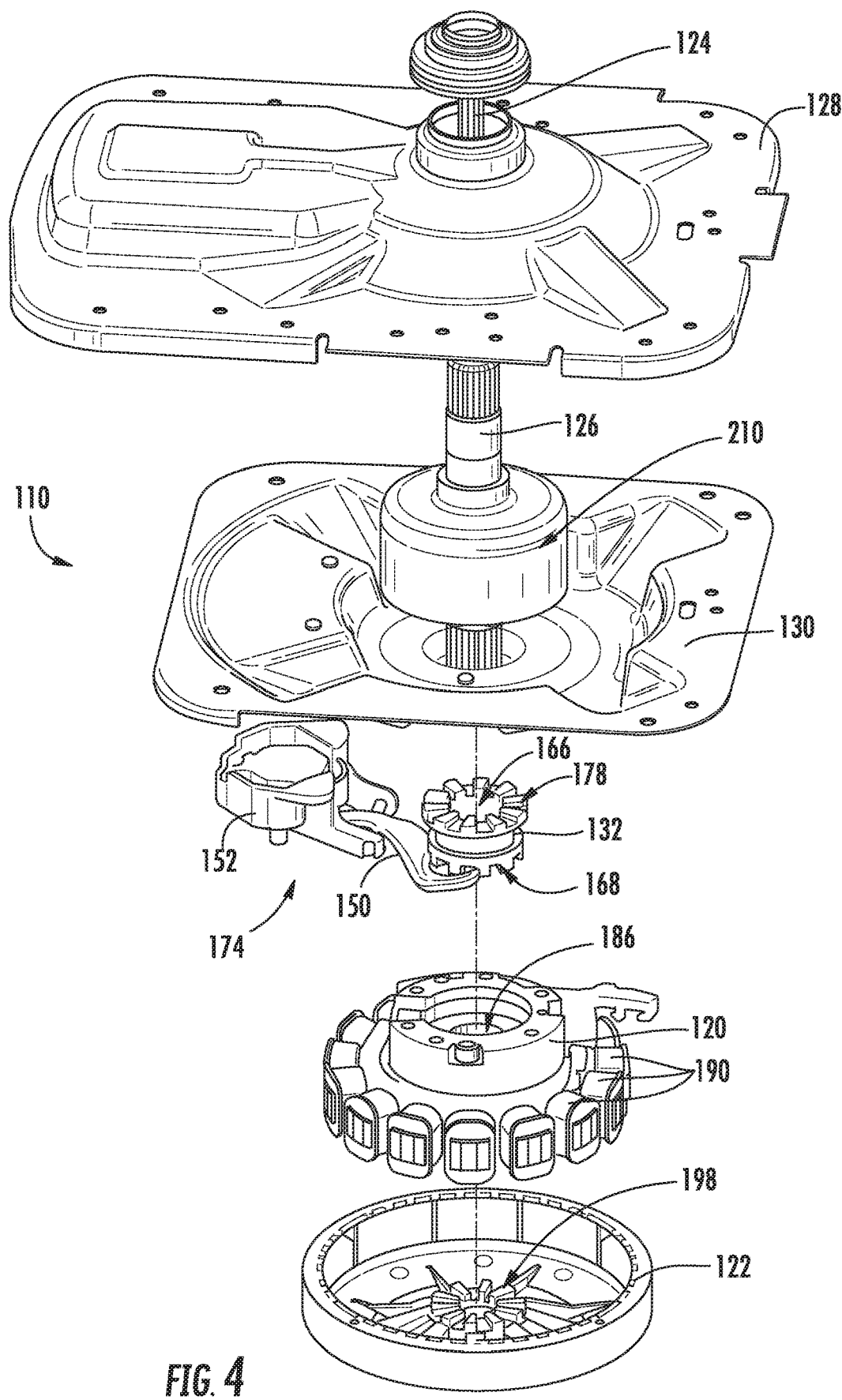
FIG. 4 provides an exploded perspective view of the exemplary drive assembly of FIG. 3.

Turning now to the figures, FIG. 1 provides a perspective view of a washing machine appliance 50 according to exemplary embodiments of the present disclosure. FIG. 2 provides a side cross-sectional view of the exemplary washing machine appliance 50 of FIG. 1. As shown, washing machine 50 including a cabinet 52 and a top cover 54. FIG. 2 is a side, sectional view of the exemplary embodiment of FIG. 1. A backsplash 56 extends from cover 54, and a control panel 58 including a plurality of input selectors 60 is coupled to backsplash 56. Control panel 58 and input selectors 60 collectively form a user interface input for operator selection of machine cycles and features. For example, in some embodiments, a display 61 indicates selected features, a countdown timer, or other items of interest to machine users.

A door or lid 62 is mounted to cover 54 and is rotatable about a hinge between an open position (not shown) facilitating access to wash tub 64 located within cabinet 52, and a closed position (shown in FIG. 1) forming an enclosure over wash tub 64. Wash tub 64 includes a bottom wall 66 and a sidewall 68. A basket 70 that is rotatably mounted within wash tub 64. A pump assembly (not shown) is located beneath tub 64 and basket 70 for gravity assisted flow when draining tub 64.

Referring now to FIG. 2, wash basket 70 is movably disposed and rotatably mounted in wash tub 64 in a spaced apart relationship from tub sidewall 68 and the tub bottom 66. Basket 70 includes an opening 72 for receiving wash fluid and a wash load therein. Basket 70 includes a plurality of perforations 74 therein to facilitate fluid communication between an interior of basket 70 and wash tub 64.

An agitation element or agitator 76, such as a vane agitator, impeller, auger, or oscillatory basket mechanism, or some combination thereof is disposed in basket 70 to impart an oscillatory motion to articles and liquid in basket 70. In different embodiments, agitator 76 includes a single action element (i.e., oscillatory only), double action (oscillatory movement at one end, single direction rotation at the other end), or triple action (oscillatory movement plus single direction rotation at one end, single direction rotation at the other end). As illustrated in FIG. 2, agitator 76 and wash basket 70 are oriented to rotate about a drive axis A (which is substantially parallel to vertical direction V). Basket 70 and agitator 76 are driven by a drive assembly 110, including permanent magnet synchronous motor 78 and drive assembly, which operates to turn or rotate agitator 76 or basket 70 with tub 64 as will be described in detail below.

Operation of washing machine appliance 50 is controlled by a controller or processing device 108 (FIG. 1) that is connected (e.g., electrically coupled) to control panel 58 for user manipulation to select washing machine cycles and features. In response to user manipulation of control panel 58, controller 108 operates the various components of washing machine appliance 50 to execute selected machine cycles and features.

Controller 108 may include a memory (e.g., non-transitive media) and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 108 may be constructed without using a microprocessor (e.g., using a combination of discrete analog or digital logic circuitry; such as switches, amplifiers, integrators, comparators, flip-flops, AND gates, and the like) to perform control functionality instead of relying upon software. Control panel 58 and other components of washing machine appliance 50, including drive assembly 110, may be in communication with controller 108 via one or more signal lines or shared communication busses.

In illustrative embodiments, laundry items are loaded into basket 70, and washing operation is initiated through operator manipulation of control input selectors 60. Wash tub 64 is filled with water and mixed with detergent to form a wash fluid. The contents of basket 70 are agitated with agitator 76 for cleansing of laundry items in basket 70. More specifically, agitator 76 is moved back and forth in an oscillatory back and forth motion by drive assembly 110. In some embodiments, agitator 76 is rotated clockwise a specified amount about the drive axis A of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitator 76 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with the pump assembly. Laundry items are then rinsed and portions of the cycle repeated, including the agitation phase, depending on the particulars of the cleaning process selected by a user. In certain embodiments, basket 70 is held in a fixed position during portions of the wash and rinse cycles while agitator 76 is oscillated as described.

One or more spin cycles may also be used as part of the cleaning process. In particular, a spin cycle may be applied after the wash cycle or after the rinse cycle in order to wring wash fluid from the articles being washed. During a spin cycle, basket 70 is rotated at relatively high speeds to help wring fluid from the laundry articles through holes 74.

Turning now to FIGS. 2 through 8 and 10, an exemplary drive assembly 110 is provided. Drive assembly 110 generally includes a motor 78 operably attached to an agitator drive shaft 124 and a wash basket drive shaft 126. When assembled, agitator drive shaft 124 extends from (e.g., in fixed attachment to) agitator 76 (FIG. 2) at a first end 242. During operations, agitator drive shaft 124 may thus rotate with agitator 76. Wash basket drive shaft 126 extends from (e.g., in fixed attachment to) wash basket 70 (FIG. 2). During operations, wash basket drive shaft 126 may thus rotate with wash basket 70. In exemplary embodiments, wash basket drive shaft 126 and agitator drive shaft 124 extend along the drive axis A. In turn, wash basket drive shaft 126 may be concentric with agitator drive shaft 124.

As shown, motor 78, includes a stator 120 and a rotor 122. When energized with the appropriate power, rotor 122 is caused to rotate while stator 120 remains fixed. Rotor 122 is attached to one end (e.g., a second or bottom end 244) of agitator drive shaft 124 through coupling 142, as will be described in greater detail below. Agitator drive shaft 124 extends along drive axis A (e.g., vertically) and is connected with a coupling 138 (FIG. 2) at the end opposite of coupling 142. Coupling 138 attaches agitator drive shaft 124 to agitator 76 (FIG. 2).

Generally, stator 120 is attached to a stationary housing 131, as will be described in greater detail below. In some embodiments, stationary housing 131 is formed by a lower clam shell 130 attached to an upper clam shell 128. The bottom wall 66 of wash tub 64 is attached to upper clam shell 128 of stationary housing 131. Stationary housing 131 forms a cavity 170 that may enclose, for example, a gear assembly.

Figure 10:
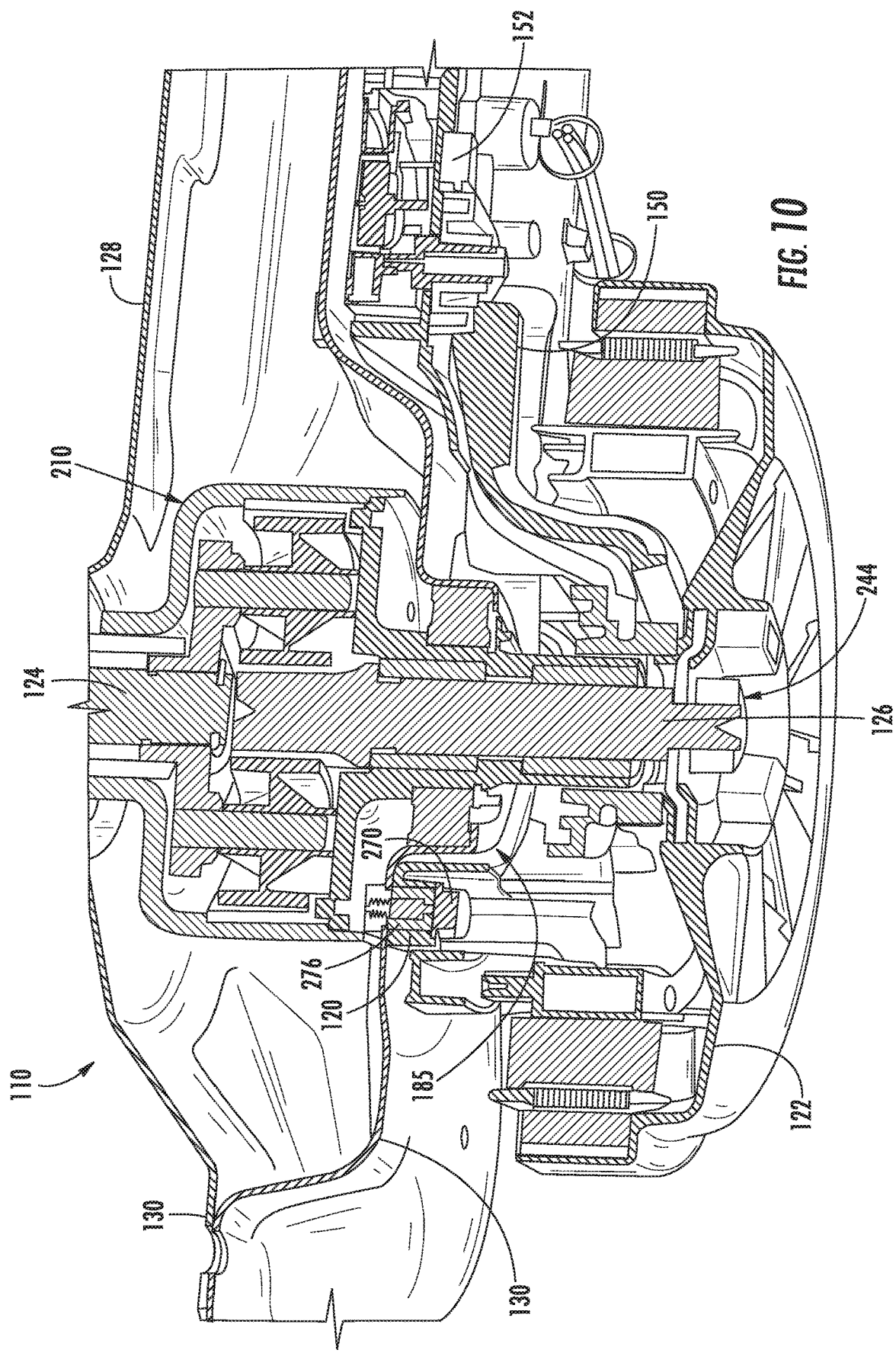
FIG. 10 provides a sectional, perspective view of the exemplary drive assembly of FIG. 3.
Figure 11:
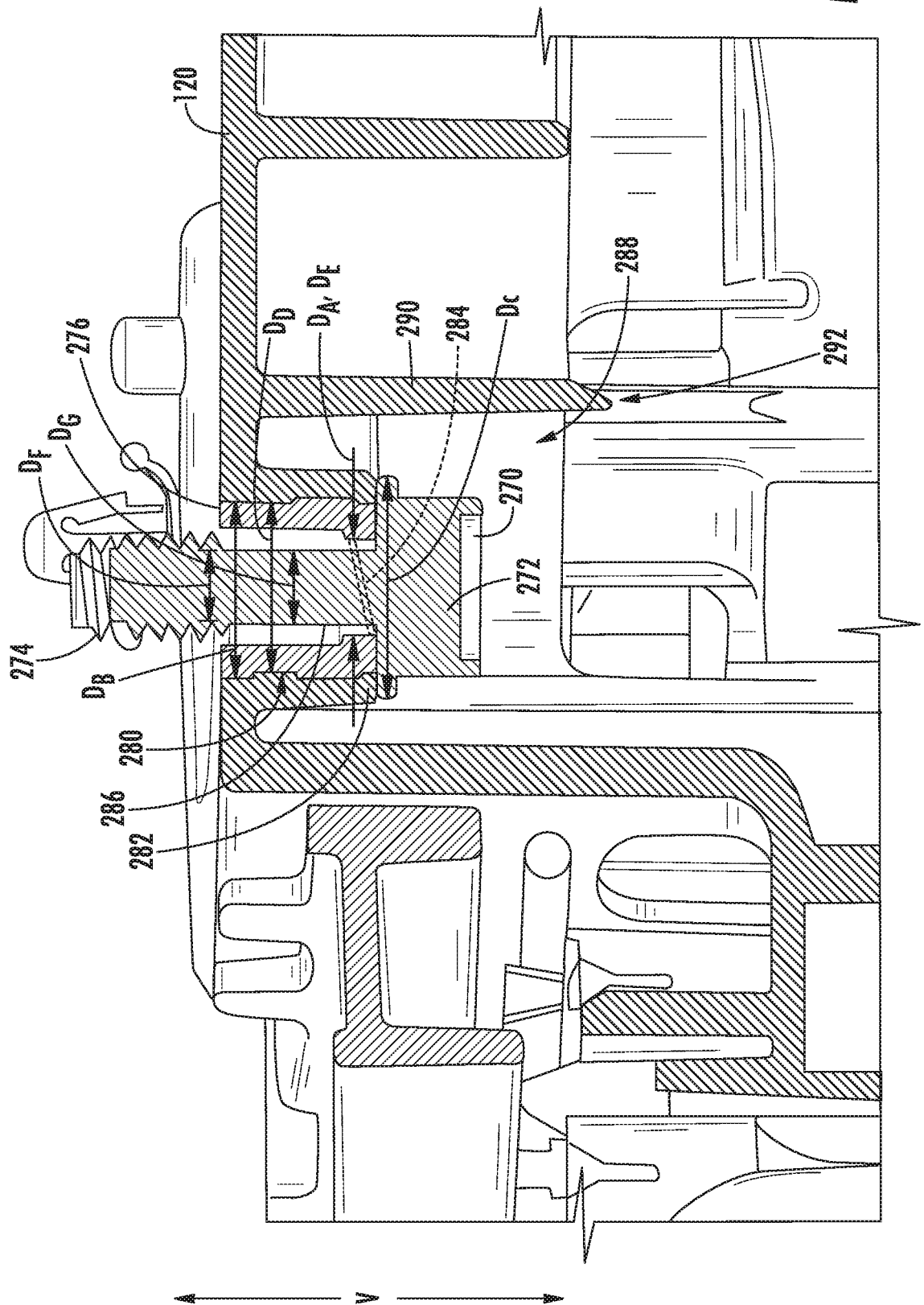
FIG. 11 is a magnified, partial, sectional view of a portion of the exemplary drive assembly of FIG. 3.
Figure 12:
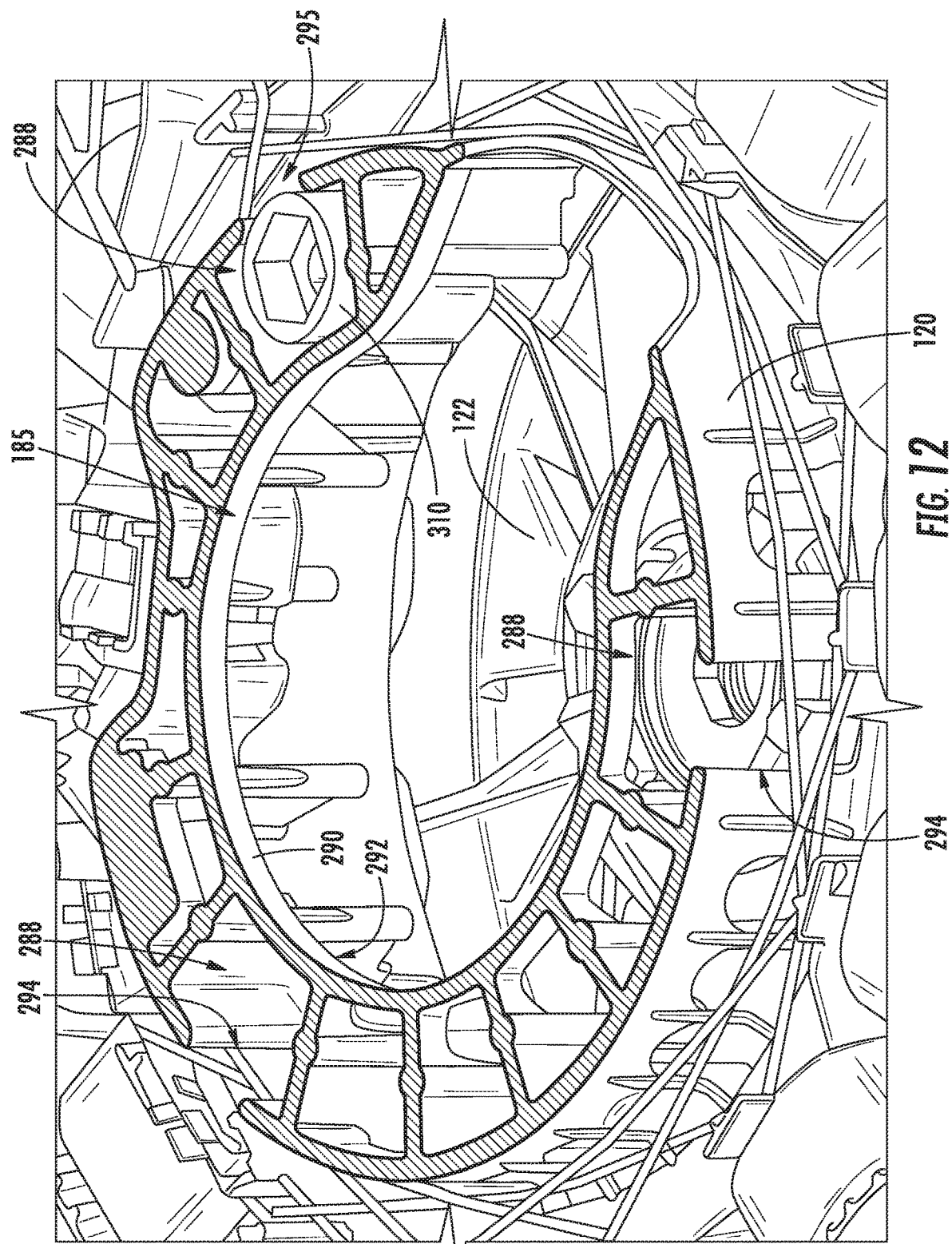
FIG. 12 provides a top, sectional, perspective view of the stator of the exemplary drive assembly of FIG. 3.

Turning generally to FIGS. 10 through 12, wash basket drive shaft 126 may be concentric with agitator drive shaft 124. For example, wash basket drive shaft 126 is connected with wash basket 70 at a threaded portion 172. Agitator drive shaft 124 can rotate within wash basket drive shaft 126 even if wash basket drive shaft 126 (and, therefore, wash basket 70) is held in a fixed position. Wash basket drive shaft 126 can also rotate within upper and lower clam shells 128 and 130 of stationary housing 131, which is mounted on wash basket drive shaft 126 using a pair of bearings 136. The position of wash basket drive shaft 126 can be fixed to hold wash basket 70 stationary while agitator 76 is oscillated during, for example, a wash or rinse cycle. Alternatively wash basket drive shaft 126 and, therefore, wash basket 70 can also be rotated with agitator 76 during a spin cycle.

In some embodiments, a gear assembly, such as an epicyclical or planetary gear assembly 210 may be provided between, for example, drive shaft 124. For example, planetary gear assembly 210 may operably connect the first and second ends 244, 246 of agitator drive shaft 124. In some such embodiments, agitator drive shaft 124 comprises a discrete first member 246 and second member 248. First member 246 of agitator drive shaft 124 extends along the drive axis A (e.g., vertically) from the first end 242 (e.g., top end) of agitator drive shaft 124 to planetary gear assembly 210. Second member 248 of agitator drive shaft 124 extends along the drive axis A (e.g., vertically) from the second end 244 (e.g., bottom end) of agitator drive shaft 124 to planetary gear assembly 210.

As a further example, planetary gear assembly 210 may operably connect the first and second ends 262, 264 of wash basket drive shaft 126. In some such embodiments, wash basket drive shaft 126 comprises a first member 266 and second member 268. First member 266 of wash basket drive shaft 126 extends along the drive axis A (e.g., vertically) from the first end 262 of wash basket drive shaft 126 to the planetary gear assembly 210. Second member 268 of wash basket drive shaft 126 extends along the drive axis A (e.g., vertically) from the second end, 264 of wash basket drive shaft 126 to planetary gear assembly 210.

As shown, planetary gear assembly 210 includes a housing 212 enclosing a meshed sun gear 214 and one or more planet gears 216. Planet gears 216 may be rotatably attached on a carrier plate 219. In the illustrated embodiments, carrier plate 219 is fixed to the first member 246 of agitator drive shaft 124. Thus, carrier plate 219 and the first member 246 of agitator drive shaft 124 may operate to follow the revolution path of planet gears 216 about sun gear 214. Additionally or alternatively, sun gear 214 may be fixed to the second member 248 of agitator drive shaft 124. For instance, sun gear 214 may be formed on a portion of the second member 248 that is disposed within housing 212.

In some embodiments, a housing wall 222 joins first and second members 266, 268 of wash basket drive shaft 126 (e.g., as a part of drive shaft 126). In other words, planet gears 216 and sun gear 214 may be mounted within housing 212 between first and second members 266, 268 of wash basket drive shaft 126. Moreover, a ring gear 218 may be mounted within housing 212. For instance, ring gear 218 may be in fixed or integral attachment with second member 268. Additionally or alternatively, ring gear 218 may be in fixed or integral attachment to an internal surface of housing wall 222. When assembled, ring gear 218 may be meshed with planet gears 216 (e.g., radially outward therefrom). During certain cycles (e.g., a wash cycle), clutch 132 is in an upward, disengaged position such that rotation of sun gear 214 (e.g., by rotor 122) drives planet gears 216, which rotate within ring gear 218. Ring gear 218 may be rotationally fixed with the drive shaft 126 such that wash basket 70 (FIG. 2) does not rotate. During other cycles (e.g., a spin cycle), clutch 132 is in a downward, engaged position such that wash basket drive shaft 126 and ring gear 218 rotate, while agitator drive shaft 124 remains stationary.

A clutch 132 is provided within drive assembly 110. Specifically, clutch 132 is slidably disposed about the drive axis A. As shown, clutch 132 extends along the drive axis A (e.g., vertically) from a top portion 232 to a bottom portion 234. Clutch 132 further includes a first coupling tine or plurality of teeth 168 along bottom portion 234 and a second coupling tine or plurality of teeth 178 along the opposing top portion 232. Teeth 168 are positioned to selectively mesh with a plurality of teeth 198 (e.g., FIGS. 4 and 8) on rotor 122 (e.g., when clutch 132 is an engaged position so as to rotate wash basket 70). Conversely, teeth 178 are positioned to selectively mesh with a plurality of teeth 182 on stator 120 (e.g., when clutch 132 is in a disengaged position so that wash basket 70 is precluded from rotating while agitator 76 is rotated).

Figure 5:
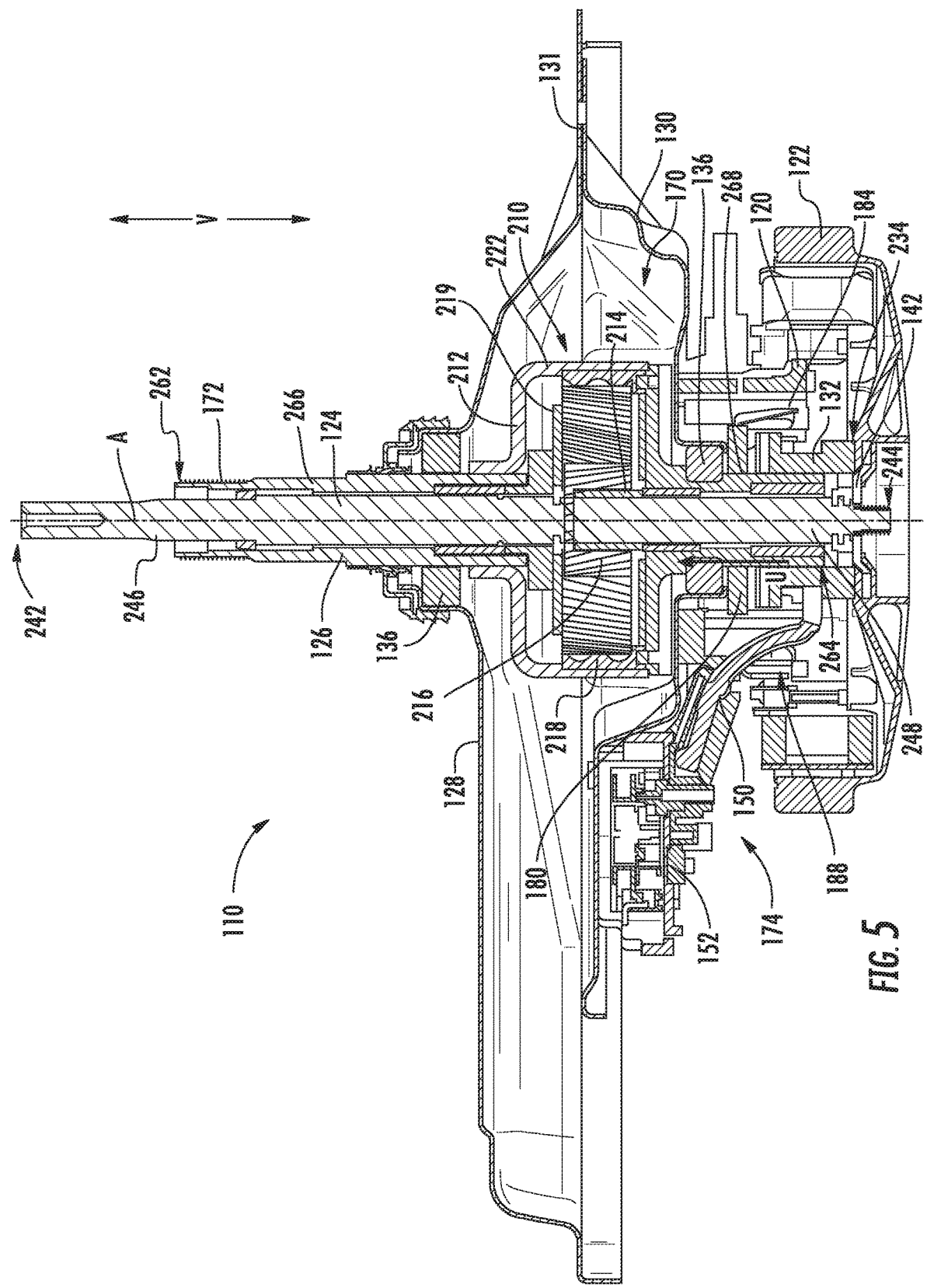
FIG. 5 provides a side, sectional view of the exemplary drive assembly of FIG. 3, wherein the drive assembly in a downward engaged position.
Figure 6:
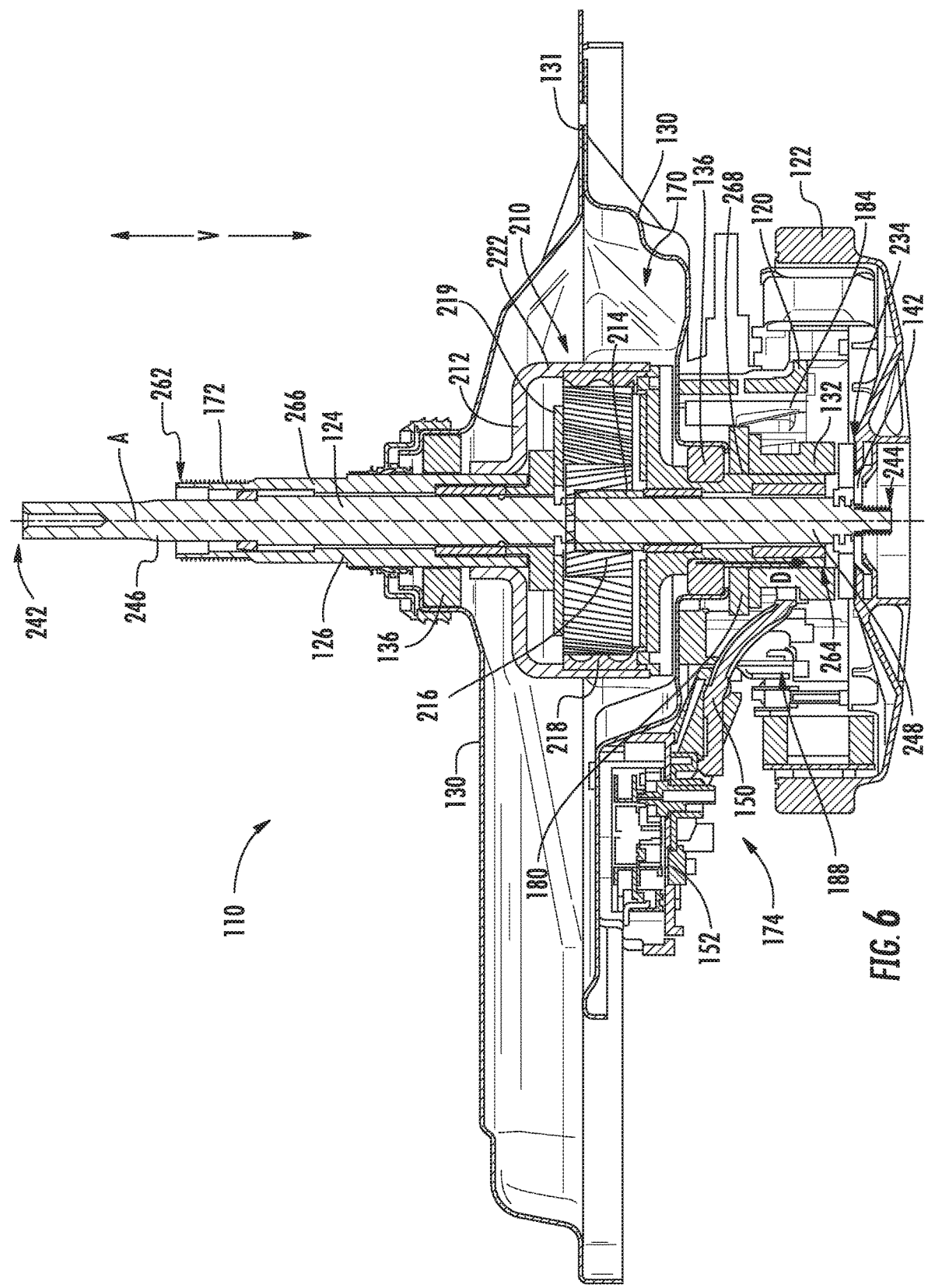
FIG. 6 provides a side, sectional view of the exemplary drive assembly of FIG. 3, wherein the drive assembly in an upward disengaged position.
Figure 9:
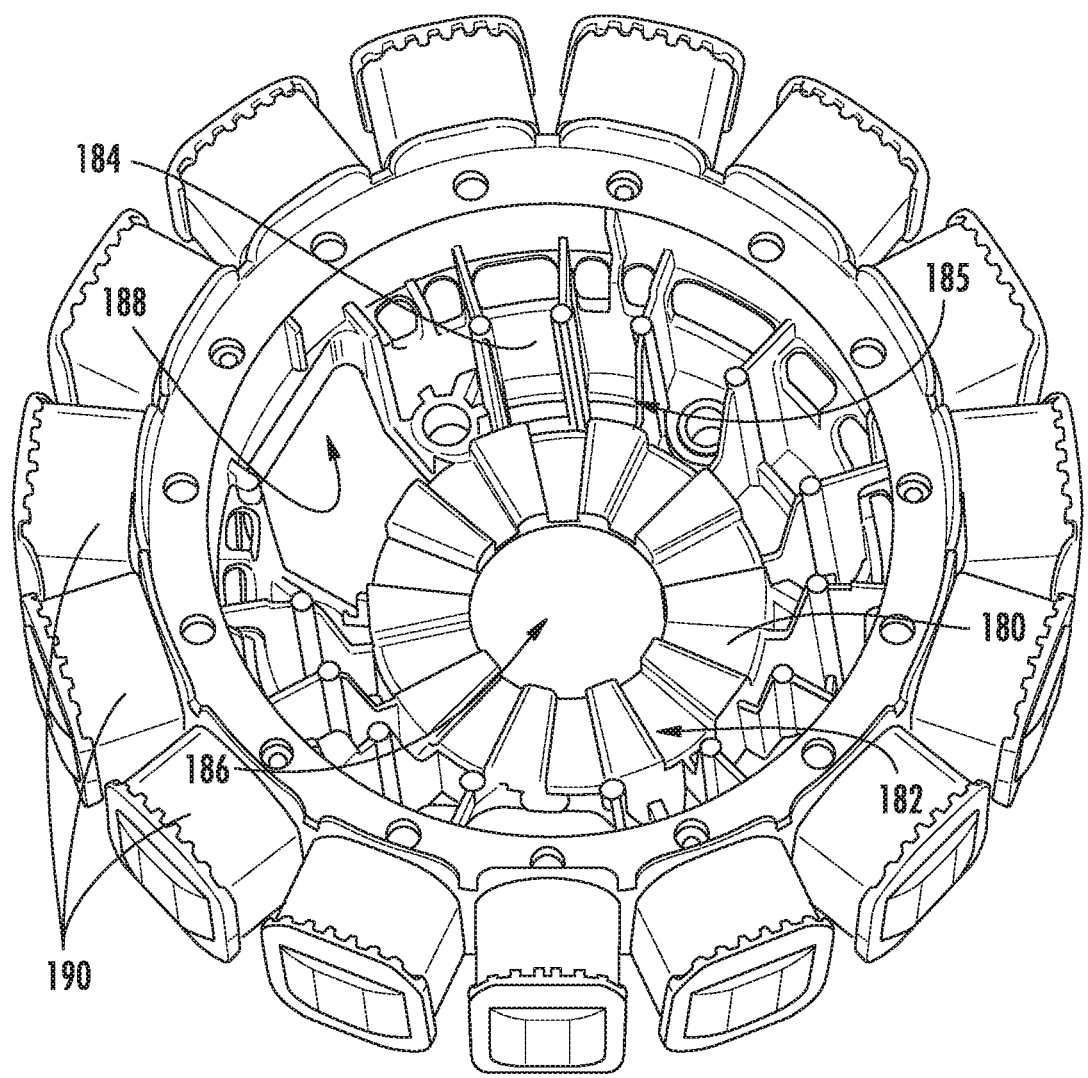
FIG. 9 provides a bottom, perspective view of the stator of the exemplary drive assembly of FIG. 3.

Turning specifically to FIGS. 5 and 6, in order to selectively control the rotation of wash basket 70 (FIG. 2), clutch 132 is used to engage and disengage wash basket drive shaft 126 from rotor 122. When assembled, clutch 132 may slide along wash basket drive shaft 126 (e.g., at the second member 268). In FIG. 5, clutch 132 is shown in a downward, engaged position in which wash basket drive shaft 126 is engaged with rotor 122 such that wash basket 70 and agitator 76 (FIG. 2) are rotated simultaneously by rotor 122. In FIG. 6, clutch 132 is shown in an upward, disengaged position in which wash basket drive shaft 126 is disengaged from rotor 122 such that the rotation of wash basket 70 is prevented while agitator 76 is rotated (e.g., during wash and rinse cycles). In this position, clutch 132 is engaged with stationary housing 131, which is attached to wash tub 64 (FIG. 2). Specifically, clutch 132 contacts stator 120 through teeth 182 (FIG. 9). Stator 120 is attached to stationary housing 131, which is further attached to tub bottom 66. Generally, clutch 132 can be shifted downward (arrow D in FIG. 6) to the engaged position shown in FIG. 5 and upward (arrow U in FIG. 5) to the disengaged position shown in FIG. 6.

Figure 7:
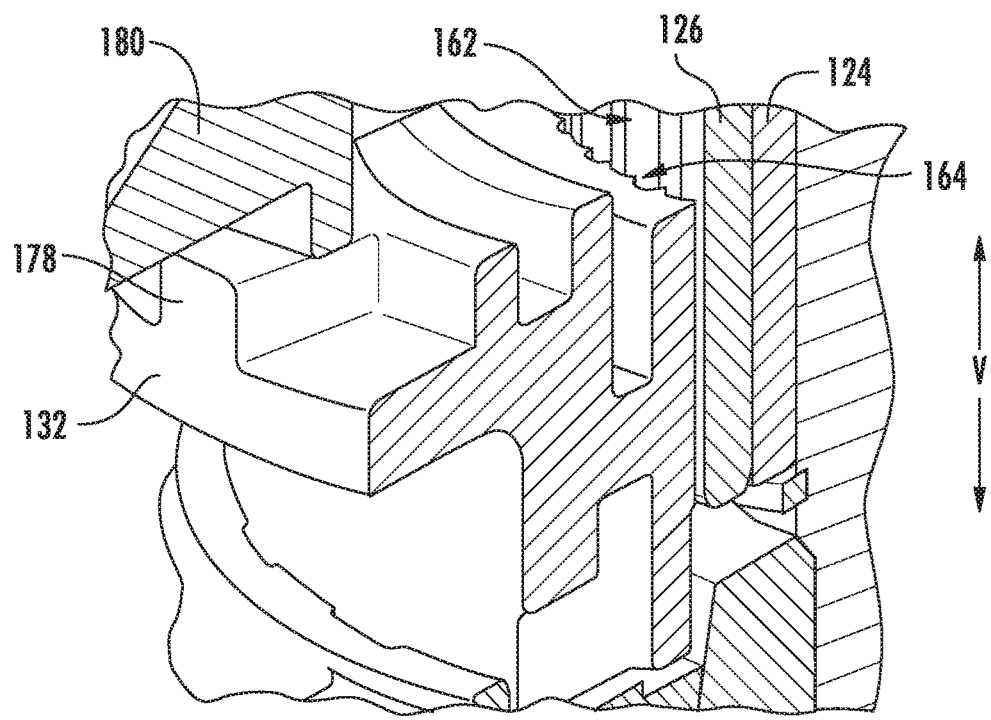
FIG. 7 is a magnified, partial, sectional view of a portion of the exemplary drive assembly of FIG. 3.
Figure 8:
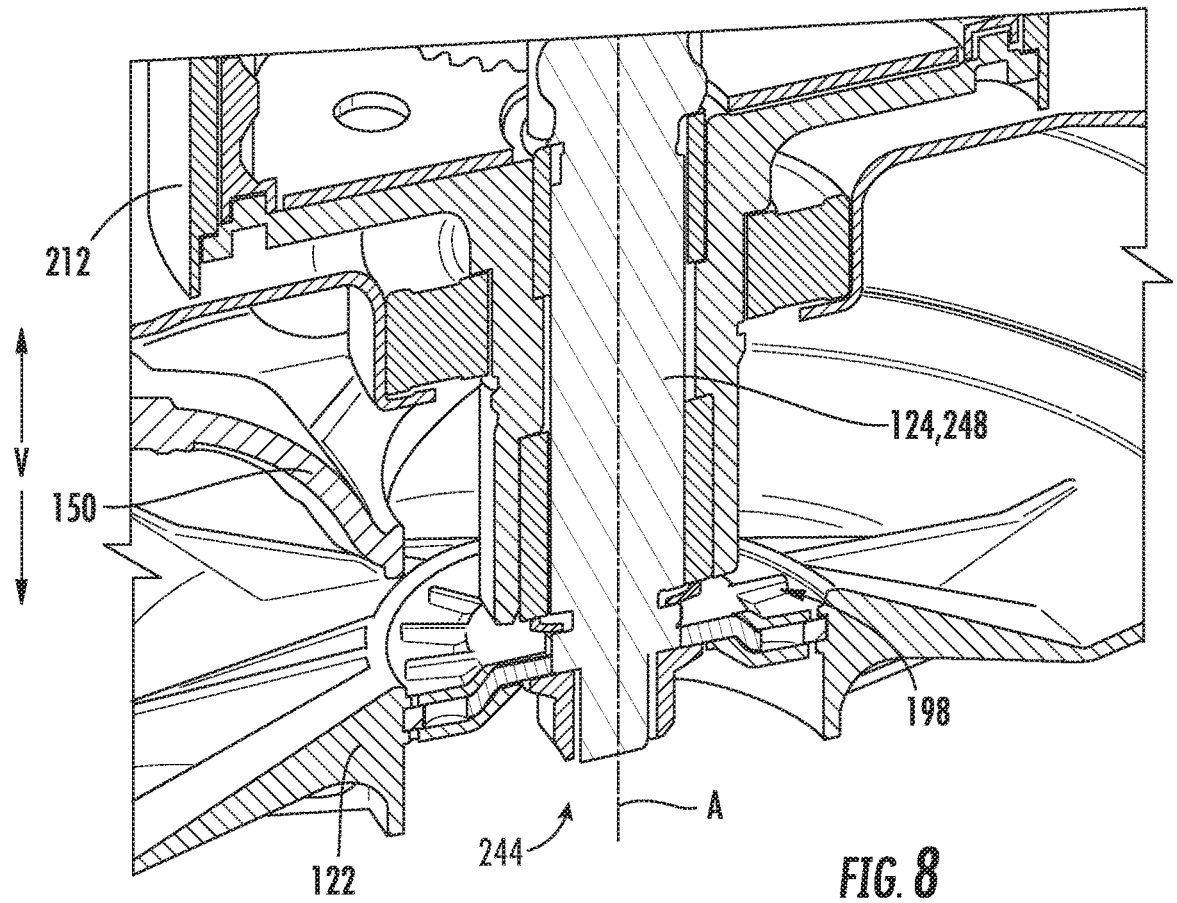
FIG. 8 provides a sectional, perspective view of a portion of an exemplary drive assembly, wherein the clutch and the stator have been removed.

As shown in FIG. 7, the outside surface of wash basket drive shaft 126 may include a first plurality of spline teeth 162 oriented along the vertical direction V and positioned circumferentially about wash basket drive shaft 126 (e.g., at the second member 268). Clutch 132 defines a central opening 166 along drive axis A (FIG. 4) into which the wash basket drive shaft 126 is slidably received. Clutch 132 defines a second plurality of spline teeth 164 that mesh with spline teeth 162. As shown, teeth 162 and 164 are positioned on opposing sides of clutch 132 along vertical direction V. Accordingly, clutch 132 can shift along wash basket drive shaft 126 in vertical direction V while, at the same time, the rotation of clutch 132 will cause wash basket drive shaft 126 to also rotate.

Turning now to FIGS. 9 through 12, stator 120 may be an integral unitary member. Specifically, an upper wall 180 may be formed integrally with a sidewall 184 to define an internal stator cavity 185. A central stator opening 186 may be defined along the drive axis A (e.g., through upper wall 180 or surrounded by sidewall 184 extending circumferentially about the drive axis A). Optionally, upper wall 180 and sidewall 184 may be formed as a continuous piece of material (e.g., with plastic) about central opening 186 and drive axis A. In some embodiments, the plurality of teeth 182 of the stator 120 may be integrally formed on upper wall 180. As shown, each of the plurality of teeth 182 is disposed about the drive axis A.

In certain embodiments, one or more linear fasteners 270 (e.g., bolts, screws, etc.) may attach or join stator 120 to stationary housing 131. For instance, a linear fastener 270 having a bolt head 272 at one end and an insertion thread 274 (e.g., helically wrapped around at least a portion of the linear fastener 270) at an opposite end may be inserted through stator 120 and stationary housing 131. When assembled, linear fastener 270 may thus extend through stator 120 (e.g., vertically through upper wall 186 or sidewall 184) to stationary housing 131. As shown, bolt head 272 may be positioned on or against stator 120 while the opposite end is held on or within stationary housing 131.

A support bushing 276 may be fixed (e.g., welded, press-fitted, or joined in an over mold) to the stator 120 to engage or support at least a portion of linear fastener 270. Specifically, support bushing 276 may be disposed about a corresponding linear fastener 270 within the same hole that linear fastener 270 passes. Thus, support bushing 276 may be fixed or embedded within upper wall 186 of stator 120. When assembled, linear fastener 270 may extend through a corresponding support bushing 276. Optionally, linear fastener 270 may slidably extend through support bushing 276. For instance, linear fastener 270 may freely slide or be translated along the central axis of support bushing 276 without being forced to rotate. Additionally or alternatively, linear fastener 270 may trans-rotatably extend through a portion of support bushing 276. For instance, a matched thread set formed between support bushing 276 and linear fastener 270 may force linear fastener 270 to rotate in tandem with axial movement.

Generally, support bushing 276 has an inner surface defining an inner diameter DA (e.g., minimum diameter) and an outer surface defining an outer diameter DB (e.g., maximum diameter). Moreover, inner diameter DA may be less than a head diameter $D_C$ of bolt head 272 and greater than at least another portion of linear fastener 270.

In exemplary embodiments, support bushing 276 is ultrasonically welded to stator 120 within the corresponding hole defined in upper wall 186 of stator 120. Optionally, the outer surface of support bushing 276 may define a recessed circular groove 280. Generally, the circular groove 280 may extend 360° about support bushing 276 (e.g., about a central axis defined by support bushing 276). Moreover, circular groove 280 may define an intermediate diameter DD that is less than the outer diameter DB and greater than the inner diameter DA. Upon ultrasonically welding support bushing 276 to stator 120, the surrounding portions (e.g., material) may fill circular groove 280, advantageously preventing support bushing 276 from being dislodged (e.g., by the vibrations generated by rotation of rotor 122). In some embodiments, multiple, axially-spaced (e.g., parallel) circular grooves 280 are defined on a single support bushing 276, as shown.

Support bushing 276 may be formed from a relatively hard or conductive first material (e.g., metal, such as low carbon steel). Additionally or alternatively, stator 120 may be formed from a relatively soft or insulating material (e.g., polymer, such as polybutylene terephthalate). In some embodiments, support bushing 276 and stator 120 may thus be formed from unique materials.

As noted above, linear fastener 270 may extend through support bushing 276. In certain embodiments, support bushing 276 includes an interior flange 282 that extends radially inward (e.g., from a portion of the inner surface) to define the minimum diameter DA about the central axis of support bushing 276. The interior flange 282 may be provided, for instance, at an end of support bushing 276 proximal to bolt head 272. When assembled, bolt head 272 may thus engage or contact interior flange 282. Optionally, the interior flange 282 may include one or more helical receiving threads 284. The minor diameter DE of such thread(s) 284 may define the minimum diameter DA of support bushing 276. In some such embodiments, linear fastener 270 includes a similarly pitched insertion thread 274 that may thus selectively engage the receiving thread(s) 284 (e.g., during assembly, as linear fastener 270 is being screwed through support bushing 276).

Although insertion and receiving threads 274, 284 may be similarly pitched or sized to engage each other, in optional embodiments, they may define unique minor diameter DFS. For instance, insertion thread 274 may define a first minor diameter DF while receiving thread 284 defines a second minor diameter DF that is larger than the first minor diameter DF. During assembly, significant force may be required to (e.g., temporarily) deform a portion of the receiving thread 284 and force insertion thread 274 therethrough. Moreover, reverse rotation of insertion thread 274, such as would be required to remove linear fastener 270 from support bushing 276, may be prevented. Thus, separation between linear fastener 270 from bushing 276 may be prevented. Advantageously, during assembling operations for appliance 100, linear fastener 270 may be inserted into support bushing 276 while at a comfortable position (e.g., directed downward) before stator 120 is positioned beneath tub 64 and the rest of the assembly is completed.

In optional embodiments, linear fastener 270 includes a smooth (e.g., non-threaded) shoulder 286 that is positioned between insertion thread 274 and bolt head 272. For instance, a linear section of linear fastener 270 may be cylindrically shaped and may be located between insertion thread 274 and bolt head 272. The smooth shoulder 286 may be thinner (i.e., have a smaller diameter) than the insertion thread 274 and bolt head 272. In some such embodiments, smooth shoulder 286 has an outer diameter DG less than or equal to the minor diameter DF of insertion thread 274. Additionally or alternatively, the outer diameter DG may be less than the minor diameter DE of receiving thread 284.

As noted above, support bushing 276 may be fixed within upper wall 186 of stator 120. In particular, support bushing 276 may be fixed at a location within upper wall 186 that is radially spaced apart from stator cavity 185 or the drive axis A. In some such embodiments, sidewall 184 further defines a vertical open chamber 288 that extends from support bushing 276 (e.g., vertically). For instance, a peripheral rim 290 may be formed on sidewall 184 and at least partially surround the hole in which support bushing 276 is fixed. Moreover, peripheral rim 290 may extend vertically (e.g., downward) from or as part of sidewall 184 to a distal edge 292. As shown, at least a portion of linear fastener 270 (e.g., bolt head 272) may be located within or at least partially enclosed by vertical open chamber 288. Thus, any tool or tool piece (e.g., ratchet socket 310, illustrated in FIG. 12) used during assembly may be forced to temporarily pass through vertical open chamber 288 before or in order to access, for instance, bolt head 272. In other words, even though a tool, such as a ratchet socket 310, is not part of the assembled appliance 100, it may be permitted to sit within vertical open chamber 288 while the tool is being used to drive or rotate a linear fastener 270. In certain embodiments, peripheral rim 290 further defines a U-shaped opening 294 that extends radially inward to the vertical open chamber 288. For instance, the U-shaped opening 294 may extend through a portion of peripheral rim 290 that is opposite from stator cavity 185. Thus, the U-shaped opening 294 may be directed radially outward and a solid portion of peripheral rim 290 may be radially positioned between U-shaped opening 294 and stator cavity 185. The gap of the U-shaped opening 294 may be disposed opposite from the upper wall 186. In turn, the distal edge 292 of peripheral rim 290 may form a C-shaped footprint.

Advantageously, tools having a larger diameter than bolt head 272 (e.g., ratchet socket 310) may be used to drive or rotate linear fastener 270 through support bushing 276 or stationary housing 131 (e.g., while being prevented from contacting or engaging wire elements disposed radially outward from and surrounding sidewall 184).

Generally, any suitable number of support bushings 276 or linear fasteners 270 may be provided to secure stator 120 to stationary housing 131. Thus, multiple support bushings 276, linear fasteners 270, and open vertical open chambers 288 may be (e.g., circumferentially) spaced apart from each other on stator 120 (e.g., about drive axis). For instance, a plurality of support bushings 276 (e.g., at least a first bushing and a second bushing) and a plurality of corresponding linear fasteners 270 (e.g., at least a first fastener and a second fasteners) may be provided, as would be understood in light of the present disclosure.

In additional or alternative embodiments, multiple magnetic windings 190 are attached to stator 120. Each magnetic winding 190 may be formed from insulated conductive wire. When assembled, the magnetic windings 190 may be circumferentially positioned about drive axis A or radially outward from sidewall 184 (e.g., to electromagnetically engage and drive rotation of rotor 122. In some embodiments, magnetic windings 190 are positioned below upper wall 180 and at least a portion of sidewall 184). Advantageously, the overall diameter of stator 120 and windings 190 may thus be reduced. Furthermore, a relatively small clearance may be required between stator 120 and rotor 122 (e.g., in a radial direction relative to drive axis A).

As shown in FIGS. 4 through 8, drive assembly 110 includes a clutch positioning assembly 174 to selectively force clutch 132 to or from the disengaged position. Some embodiments include a yoke 150 having one or more arms 194 (e.g., a pair of arms) positioned in contact with clutch 132 to selectively force clutch 132 into the disengaged position. A lift motor 152 may be operably coupled to yoke 150 (e.g., to pivot yoke 150—and thereby move clutch 132—upward and downward). When assembled, yoke 150 may extend from lift motor 152 to clutch 132. Specifically, yoke 150 may extend through a sidewall opening 188 defined in stator 120. Lift motor 152 may be mounted at a position above stator 120 (e.g., above upper wall 180 of stator 120). Specifically, lift motor 152 may be mounted (e.g., in fixed attachment) to lower clam shell 130. Thus, yoke 150 may extend from a position above stator 120 to a position below the plurality of teeth 182 of stator 120.

During use, yoke 150 with arms 194 can be used to provide a force to push (i.e., lift) clutch 132 in the vertical direction V along drive axis A. The force provided by yoke 150 causes the second plurality of teeth 178 to mesh with teeth 182 of stator when assembly 174 is operated to move clutch 132 from the engaged position to the disengaged position. In addition, yoke 150 may be formed as an elastically flexible member. If teeth 178 and teeth 182 do not immediately line up during use, yoke 150 may deflect until teeth 178 and teeth 182 may be biased into alignment and direct meshed engagement.

Figure 13:
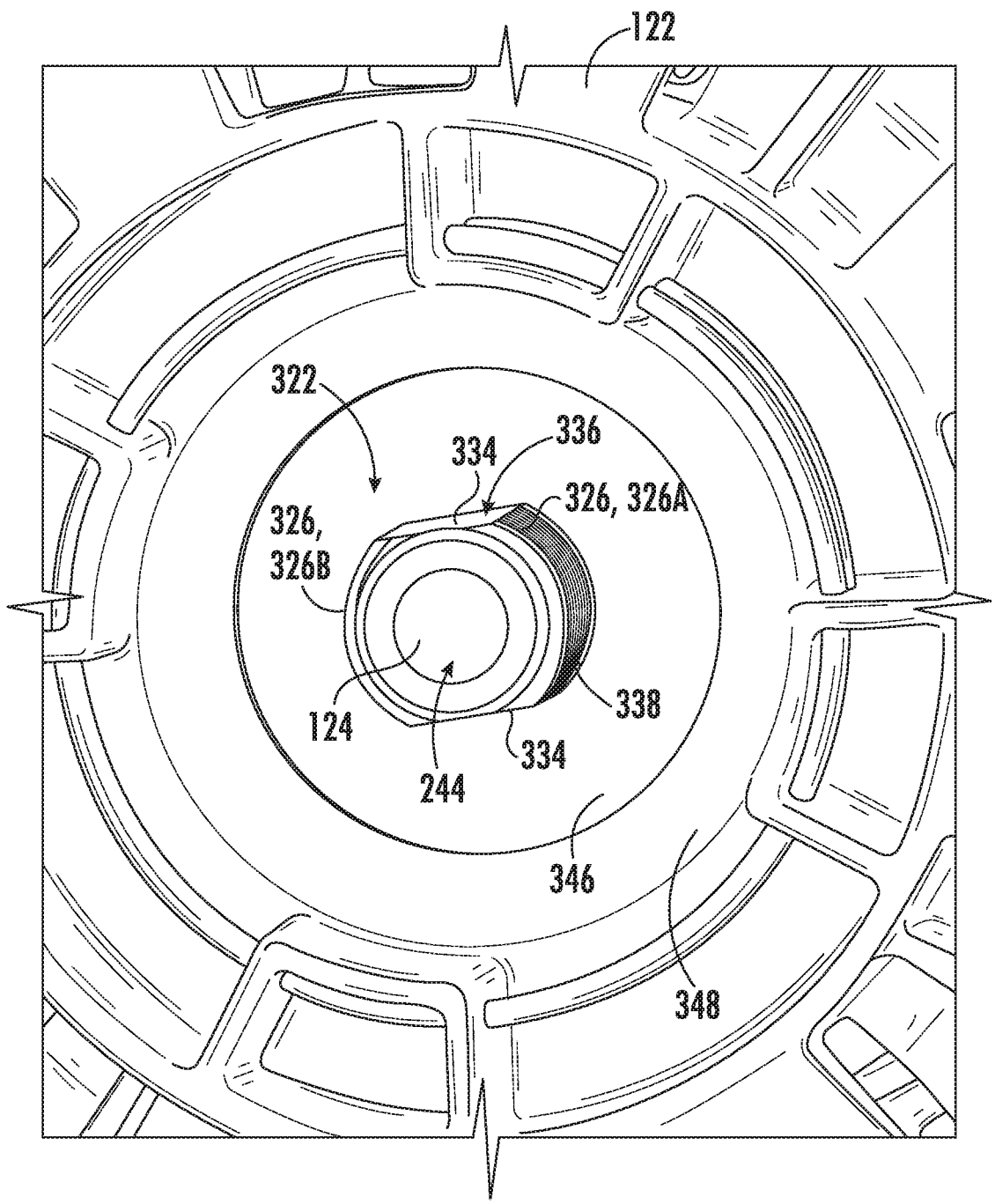
FIG. 13 provides a bottom perspective view of a portion of a drive assembly according to exemplary embodiments of the present disclosure, wherein a fastening nut has been removed for clarity.
Figure 14:
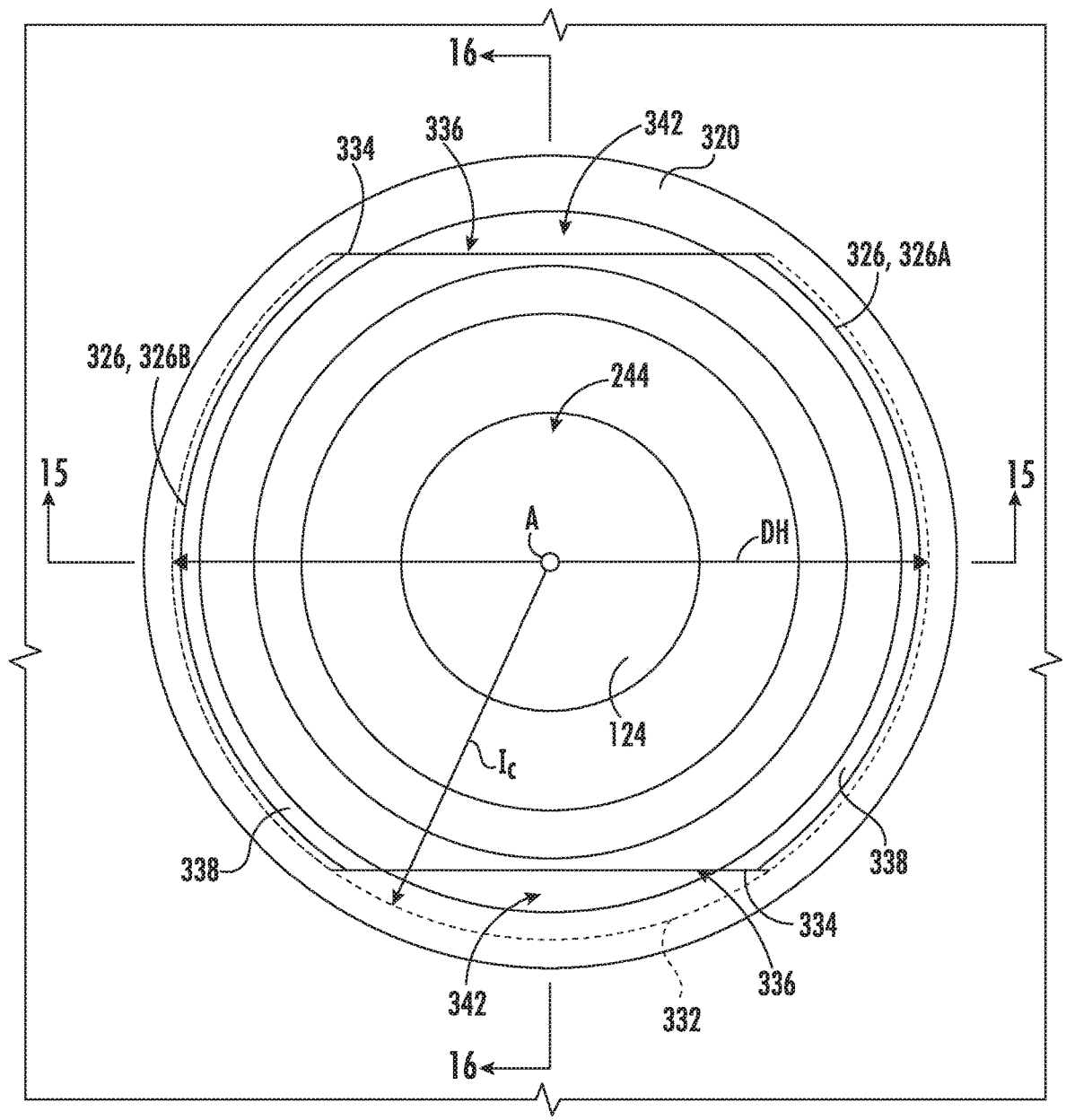
FIG. 14 provides a schematic plan view of a bottom end of an agitator drive shaft of a drive assembly according to exemplary embodiments of the present disclosure.
Figure 15:
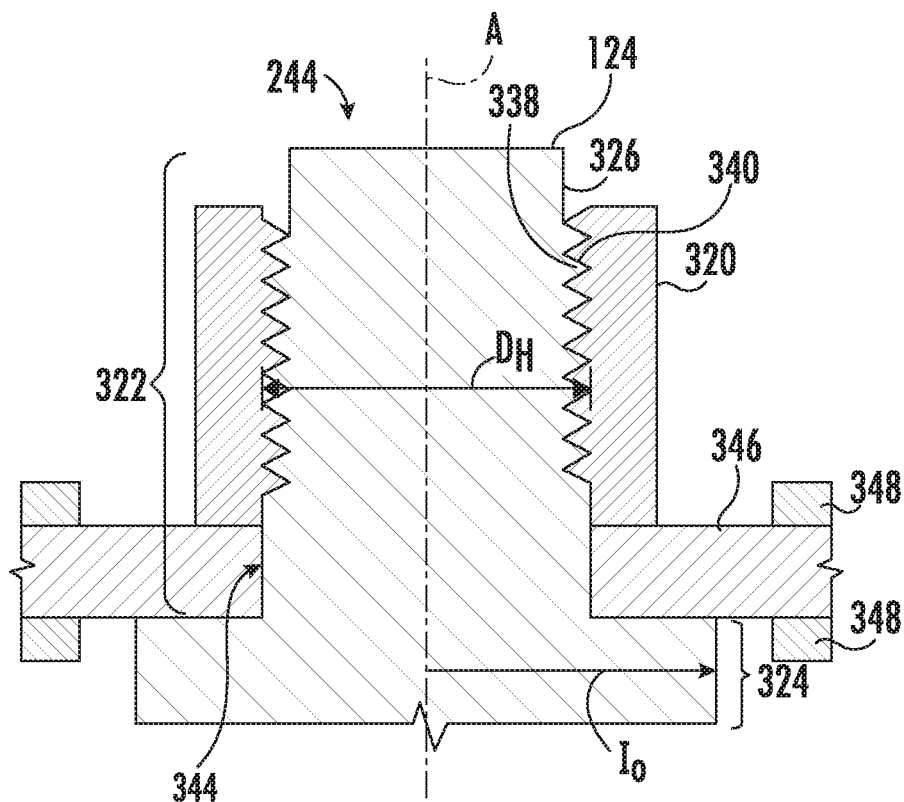
FIG. 15 provides a schematic sectional view taken along the line 15-15 and including a bottom end of the exemplary agitator drive shaft of FIG. 14.
Figure 16:
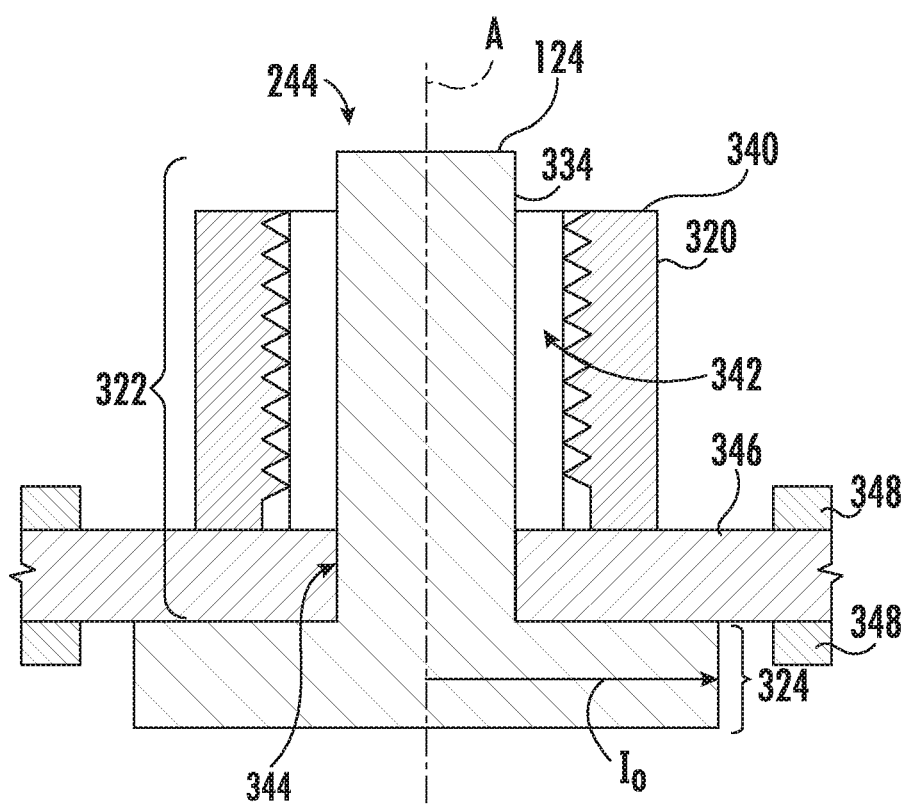
FIG. 16 provides a schematic sectional view taken along the line 16-16 and including a bottom end of the exemplary agitator drive shaft of FIG. 14.

Turning now to FIGS. 13 through 16, various views are provided of a bottom portion of drive assembly 110. In particular, the second or bottom end 244 of agitator drive shaft 124 is shown in an attached position or configuration with rotor 122. When assembled, a removable fastener (e.g., fastening nut 320) may join agitator drive shaft 124 to rotor 122, as illustrated in FIGS. 14, 15, and 16. For the sake of clarity, however, no such removable fastener is shown in FIG. 13.

As shown, agitator drive shaft 124 may include a mounting portion 322 about the drive axis A at the second end 244. Generally, mounting portion 322 has a circumferential shape or profile that is different or distinct from another portion of agitator drive shaft 124. For instance, agitator drive shaft 124 may include an enlarged portion 324 having a wider outer radius $I_O$ (e.g., measured from drive axis A) than at least some, if not all, of mounting portion 322. Such an enlarged portion 324 may be disposed above mounting portion 322 (e.g., as defined when appliance is in a use position, as illustrated in FIGS. 1 and 2).

In some embodiments, mounting portion 322 includes a discrete curved face 326 and recessed face 334. As shown, the curved face 326 is defined along a semi-circular profile 332 while the recessed face 334 is defined radially-inward from the semi-circular profile 332. The semi-circular profile 332 extends circumferentially about the drive axis A from a first point to a second point. A constant radius $I_C$ defines semi-circular profile 332 from the first point to the second point. Optionally, the constant radius $I_C$ of semi-circular profile 332 may be less than the wider outer radius $I_O$ of the enlarged portion 324.

Together, the curved face 326 and the recessed face 334 may define the outer radial edges of mounting portion 322. Thus, the recessed face 334 defines a circumferential space about drive axis A and generally interrupts the circumferential path of semi-circular profile 332. The circumferential space defined by recessed face 334 prevents mounting portion 322 from defining a complete circle or circular profile perpendicular to the drive axis A. In other words, the curved face 326 and semi-circular profile 332 extend less than 360° about the drive axis A.

When assembled, curved face 326 may contact an inner surface of a removable fastener, such as fastening nut 320. In certain embodiments, the curved face 326 defines a shaft thread 338 (or threads) along a helical path about drive axis A. For instance, curved face 326 may be threaded (e.g., with or by the shaft thread 338 formed thereon) to engage a complementary fastener (e.g., fastening nut 320). A major diameter DH of shaft thread 338 may be defined by or otherwise extend to the constant radius $I_C$ of semi-circular profile 332. Additionally or alternatively, shaft thread 338 may be defined as an insertion thread with which a complementary receiving thread 340 may be engaged or enmeshed. Such a complementary receiving thread 340 may be defined by the inner surface of a removable fastening nut 320, as illustrated.

Since recessed face 334 is radially inward from curved face 326, a radial gap 342 may be radially disposed between recessed face 334 and a portion of the inner surface of fastening nut 320. The radial gap 342 may be located at or defined within the same area as the circumferential space defined by recessed face 334. For instance, when assembled, a subsection or arc of receiving thread 340 may be unengaged and extend toward the circumferential space such that the radial gap 342 is defined (e.g., along the radial direction) between fastening nut 320 and recessed face 334. In optional embodiments, recessed face 334 defines a planar surface 336 perpendicular to the drive axis A. Additionally or alternatively, the planar surface 336 may be radially spaced apart from drive axis A. Thus, the radial gap 342 between recessed face 334 and the inner surface of fastening nut 320 may form a circular segment (e.g., as opposed to a circular sector or other potential shape) in a plane perpendicular to the drive axis A, as shown in FIG. 14. Advantageously, recessed face 334 may be easily machined or formed from an initially cylindrical structure.

In optional embodiments, mounting portion 322 may include multiple curved faces 326. For instance, at least two curved faces 326A, 326B may be circumferentially spaced apart from each other. As illustrated, in some such embodiments, a first curved face 326A defined along the semi-circular profile 332 is spaced apart from a second curved face 326B that is also defined along the semi-circular profile 332. Thus, the first and second curved faces 326A, 326B may be defined at the same radius (e.g., constant radius $I_C$). Optionally, the second curved face 326B may be disposed opposite of the first curved face 326A. Additionally or alternatively, the first and second curved faces 326A, 326B may define equal circumferential lengths. Further additionally or alternatively, the first and second curved faces 326A, 326B may define corresponding shaft threads 338 along the same helical path. The pitch and size of the shaft threads 338 may be equal, such that the receiving thread(s) 340 of fastening nut 320 may simultaneously be engaged or enmeshed with the multiple shaft threads 338, thereby securing receiving thread 340 to mounting portion 322.

Between the curved faces 326A, 326B, multiple recessed faces 334 may further be provided. Thus, a discrete radial gap 342 may be defined between each circumferential end of the curved faces 326A, 326B. Moreover, the number of radial gaps 342 may correspond to the number of curved faces 326A, 326B. Optionally, the recessed faces 334 may be defined as identical (e.g., according to the same length, radial distance from drive axis A, or shape) to each other. For instance, a pair of planar surfaces 336 having the same length may be defined at the same radial distance from drive axis A, as shown.

When assembled, agitator drive shaft 124 may extend through at least a portion of rotor 122. Specifically, rotor 122 may define a central aperture 344 along the drive axis A through which mounting portion 322 may extend. When assembled, one portion of agitator drive shaft 124 (e.g., enlarged portion 324) is disposed above central aperture 344 while another portion of agitator drive shaft 124 (e.g., mounting portion 322) is disposed below central aperture 344. In some embodiments, central aperture 344 defines an interior profile that is complementary to the mounting portion 322 of the agitator drive shaft 124, as shown. Thus, the inner radial edges of the central aperture 344 may mirror the outer radial edges of the curved faces(s) 326 and recessed face(s) 334. Rotor 122 may, in turn, be advantageously held in place and prevented from rotating relative to agitator drive shaft 124 (e.g., during assembly, before fastening nut 320 is able to hold rotor 122 against enlarged portion 324).

In certain embodiments, rotor 122 is formed as an overmolded element. For instance, a metal sub-frame 346 may of rotor 122 act as a substrate for a polymer body 348. Optionally, metal sub-frame 346 may include or be provided as a sheet metal (e.g., stainless steel). Advantageously, central aperture 344 may be stamped through sheet metal. In turn, agitator drive shaft 124 may be attached to rotor 122 without requiring an expensive or complex assembly wherein agitator drive shaft 124 has an integral spline joining agitator drive shaft 124 and rotor 122.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
    a wash tub for the receipt of laundry articles and fluid for cleaning;
    a wash basket received in the wash tub to retain the laundry articles;
    an agitator rotatably positioned in the wash basket to impart motion to the laundry articles within the wash basket;
    an agitator drive shaft attached to the agitator to rotate therewith, the agitator drive shaft extending along a drive axis from a first end to a second end, the second end defining a mounting portion about the drive axis, the mounting portion comprising a curved face and a recessed face, the curved face being defined along a semi-circular profile, the semi-circular profile extending circumferentially about the drive axis, and the recessed face being defined radially-inward from the semi-circular profile to define a circumferential gap about the drive axis;
    a stationary housing disposed about the agitator drive shaft, the stationary housing being attached to the wash tub; and
    a motor operably connected to the agitator drive shaft to drive rotation thereof, the motor comprising
        a rotor fixed to the agitator drive shaft at the second end, the rotor defining a central aperture along the drive axis, the central aperture defining an interior profile complementary to the mounting portion of the agitator drive shaft, and
        a stator rotationally fixed and positioned radially inward from the rotor,
        wherein the rotor comprises a sheet metal sub-frame defining the central aperture and a polymer body molded on the sheet metal sub-frame.

2. The washing machine appliance of claim 1, wherein the curved face defines shaft thread along a helical path.

3. The washing machine appliance of claim 1, wherein the recessed face defines a planar surface perpendicular to the drive axis.

4. The washing machine appliance of claim 1, wherein the curved face is a first curved face, and wherein the mounting portion further comprises a second curved face defined along the semi-circular profile and circumferentially spaced apart from the first curved face.

5. The washing machine appliance of claim 1, further comprising a fastening nut selectively joined to the mounting portion, the fastening nut contacting the curved face while defining a radial gap with the recessed face.

6. The washing machine appliance of claim 1, further comprising a wash basket drive shaft rotationally independent from the agitator drive shaft.

7. The washing machine appliance of claim 6, wherein the wash basket drive shaft is concentric with the agitator drive shaft.

8. The washing machine appliance of claim 6, further comprising a clutch slidably disposed on the wash basket drive shaft, the clutch being movable between an engaged position and a disengaged position, the disengaged position providing the clutch in rotationally fixed attachment on the stator, and the engaged position providing the clutch away from the stator and rotatable relative thereto.

9. The washing machine appliance of claim 1, further comprising a stationary housing disposed about the agitator drive shaft, wherein the stator is fixed to the stationary housing.

10. A drive assembly for a washing machine appliance, the drive assembly comprising:
    an agitator drive shaft extending along a drive axis from a first end to a second end, the second end defining a mounting portion about the drive axis, the mounting portion comprising a curved face and a recessed face, the curved face being defined along a semi-circular profile, the semi-circular profile extending circumferentially about the drive axis, and the recessed face being defined radially-inward from the semi-circular profile to define a circumferential gap about the drive axis; and
    a motor operably connected to the agitator drive shaft to drive rotation thereof, the motor comprising
        a rotor fixed to the agitator drive shaft at the second end, the rotor defining a central aperture along the drive axis, the central aperture defining an interior profile complementary to the mounting portion of the agitator drive shaft, and
        a stator rotationally fixed and positioned radially inward from the rotor,
        wherein the rotor comprises a sheet metal sub-frame defining the central aperture and a polymer body molded on the sheet metal sub-frame.

11. The drive assembly of claim 10, wherein the curved face defines shaft thread along a helical path.

12. The drive assembly of claim 10, wherein the recessed face defines a planar surface perpendicular to the drive axis.

13. The drive assembly of claim 10, wherein the curved face is a first curved face, and wherein the mounting portion further comprises a second curved face defined along the semi-circular profile and circumferentially spaced apart from the first curved face.

14. The drive assembly of claim 10, further comprising a fastening nut selectively joined to the mounting portion, the fastening nut contacting the curved face while defining a radial gap with the recessed face.

15. The drive assembly of claim 10, further comprising a wash basket drive shaft rotationally independent from the agitator drive shaft.

16. The drive assembly of claim 15, wherein the wash basket drive shaft is concentric with the agitator drive shaft.

17. The drive assembly of claim 15, further comprising a clutch slidably disposed on the wash basket drive shaft, the clutch being movable between an engaged position and a disengaged position, the disengaged position providing the clutch in rotationally fixed attachment on the stator, and the engaged position providing the clutch away from the stator and rotatable relative thereto.

18. The drive assembly of claim 10, further comprising a stationary housing disposed about the agitator drive shaft, wherein the stator is fixed to the stationary housing.

19. A washing machine appliance, comprising:
    a wash tub for the receipt of laundry articles and fluid for cleaning;

a wash basket received in the wash tub to retain the laundry articles;

an agitator rotatably positioned in the wash basket to impart motion to the laundry articles within the wash basket;

an agitator drive shaft attached to the agitator to rotate therewith, the agitator drive shaft extending along a drive axis from a first end to a second end, the second end defining a mounting portion about the drive axis, the mounting portion comprising a curved face and a recessed face, the curved face being defined along a semi-circular profile, the semi-circular profile extending circumferentially about the drive axis, and the recessed face being defined radially-inward from the semi-circular profile to define a circumferential gap about the drive axis, the agitator drive shaft further defining an enlarged portion above the mounting portion, the enlarged portion having an outer radius that is wider than the semi-circular profile;

a stationary housing disposed about the agitator drive shaft, the stationary housing being attached to the wash tub; and a motor operably connected to the agitator drive shaft to drive rotation thereof, the motor comprising a rotor fixed to the agitator drive shaft at the second end, the rotor comprising a sheet metal sub-frame defining a central aperture as a stamped aperture through the sheet metal sub-frame along the drive axis, the central aperture defining an interior profile complementary to the mounting portion of the agitator drive shaft, the rotor further comprising a polymer body molded on the sheet metal frame and radially spaced apart from the central aperture, a stator rotationally fixed and positioned radially inward from the rotor, and a fastening nut selectively joined to the mounting portion in contact with the metal sub-frame, the fastening nut further contacting the curved face while defining a radial gap with the recessed face, wherein the recessed face defines a planar surface perpendicular to the drive axis.

\* \* \* \* \*